United States Patent [19]
Johansson

[11] Patent Number: 4,876,063
[45] Date of Patent: Oct. 24, 1989

[54] DOUBLE-D WATER ROD FOR 9 BY 9 FUEL BUNDLE

[75] Inventor: Eric B. Johansson, San Jose, Calif.

[73] Assignee: General Electric Company, San Jose, Calif.

[21] Appl. No.: 169,546

[22] Filed: Mar. 17, 1988

[51] Int. Cl.⁴ .............................................. G21C 3/32
[52] U.S. Cl. .................................... 376/444; 376/439; 376/443
[58] Field of Search ....................... 376/444, 439, 443

[56] References Cited

U.S. PATENT DOCUMENTS

| | | | |
|---|---|---|---|
| 4,571,324 | 2/1986 | Johansson | 376/441 |
| 4,597,937 | 7/1986 | Sakurai | 376/441 |
| 4,649,632 | 3/1987 | Schoenig | 29/701 |
| 4,675,154 | 6/1987 | Nelson | 376/444 |
| 4,726,926 | 2/1988 | Patterson | 376/439 |
| 4,755,348 | 7/1988 | Shiralkar | 376/282 |
| 4,777,016 | 10/1988 | Yoshioka | 376/444 |

*Primary Examiner*—Donald P. Walsh
*Attorney, Agent, or Firm*—Robert R. Schroeder

[57] ABSTRACT

In a nuclear fuel bundle having a lower tie-plate, an upper tie-plate and a surrounding channel therebetween, an improved water rod is disclosed for preferable use when fuel rods held between the tie-plates are placed in a 9 by 9 array. Typically, seven fuel rods are omitted centrally of the 9 by 9 array with the middle or fifth row having three rods removed and paired rods being removed in the 4th and 6th row with displacement of the removed pair towards opposite corners. Into the volume created by the removal rods, there are placed two "D" sectioned rods, the "D" rods each being round in cross-section except for a truncating chord, this truncating chord defining the straight back of each "D". In the preferred embodiment one of the "D" water rods is provided with spacer tabs for maintaining spacers separating the fuel rod at their correct elevations. This rod is inserted with an alignment that permits the tabs to pass through the spacers. When the rod is fully inserted, it is rotated to a locking alignment so that the tabs capture the spacers. In this locked alignment, the straight back of the "D" is aligned to confront the straight back of the confronting "D" on the remaining water rod. When the remaining "D" rod is inserted with the backs confronted mutual, locking of both "D" sectioned water rod occurs. Provision is made for narrowing of the upper and lower sections of the water rods. The upper and lower sections, with reduced cross-sections are supported by the upper and lower tie plates, respectively. There results a water rod which efficiently utilizes the available space, has low manufacturing costs, and provides for spacer capture enabling ease of assembly and disassembly of the fuel bundle.

5 Claims, 4 Drawing Sheets

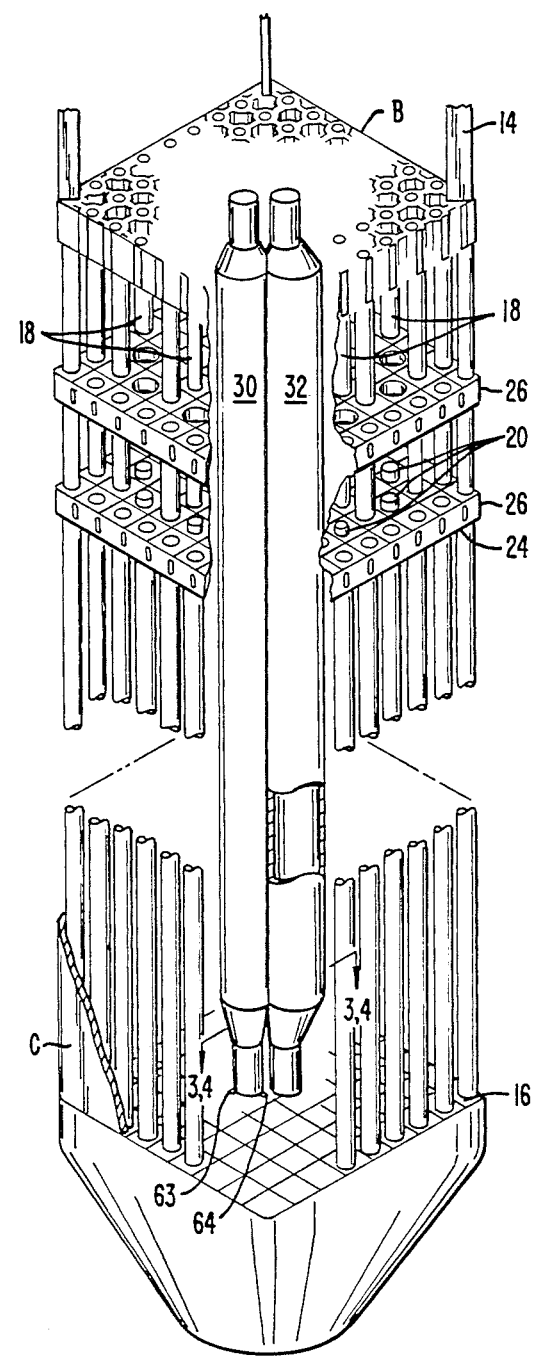
FIG._1.

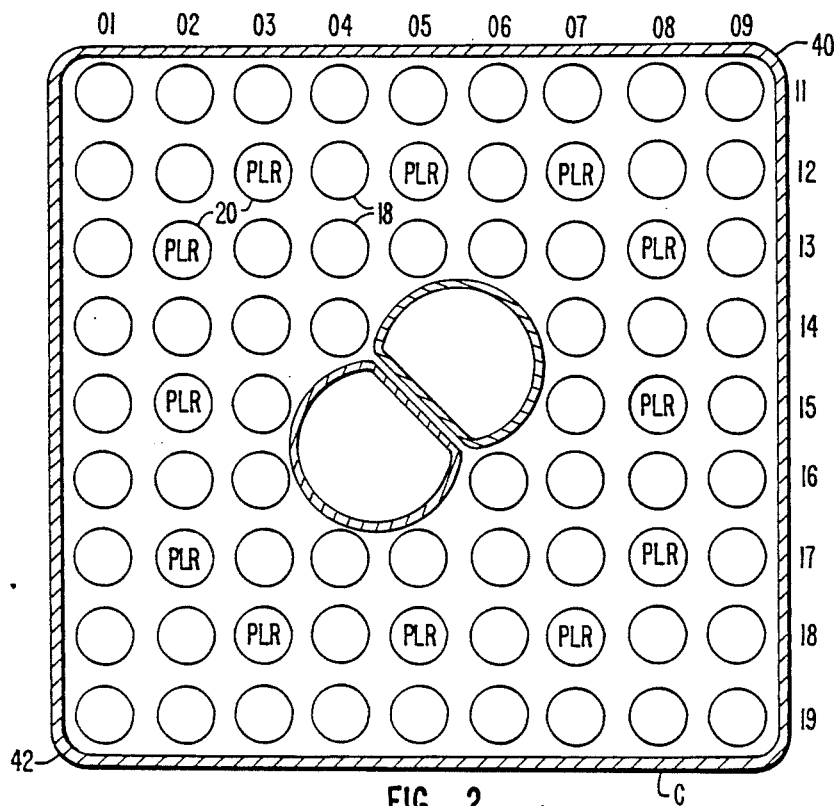
FIG._2.
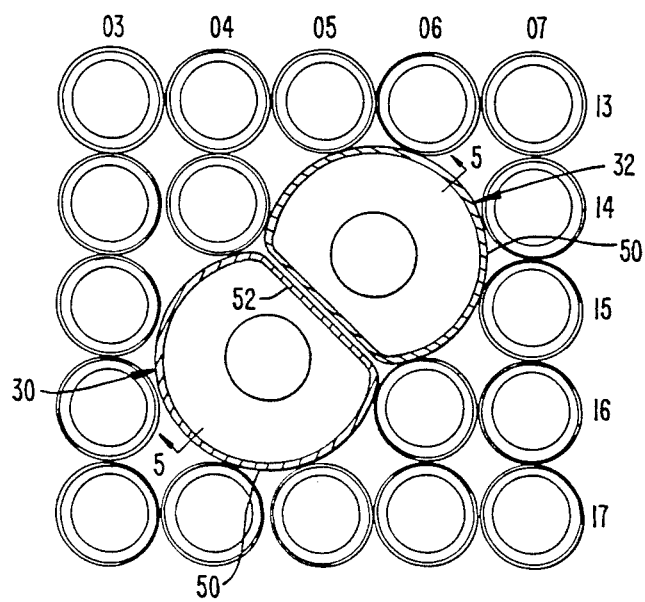
FIG._3.

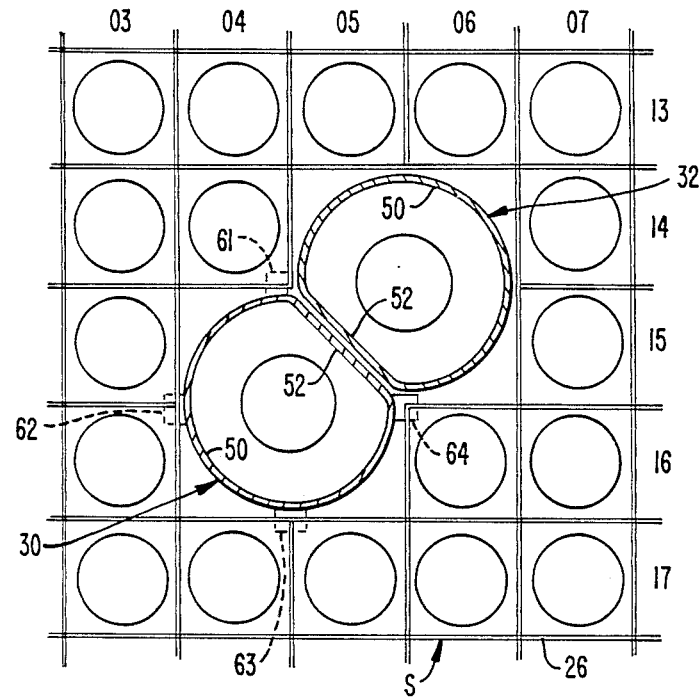
FIG._4.
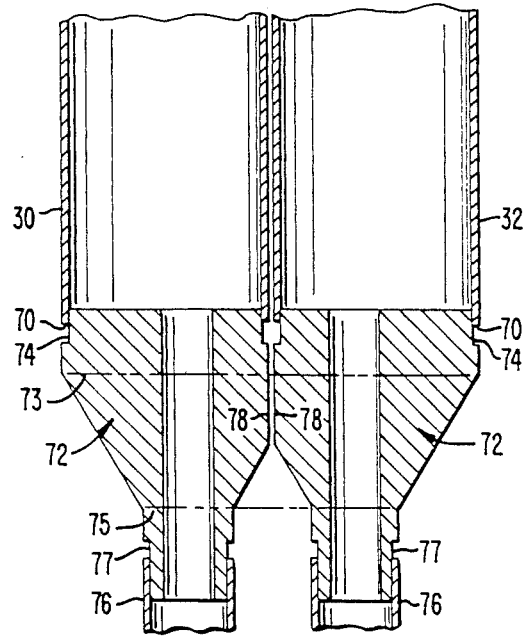
FIG._5.

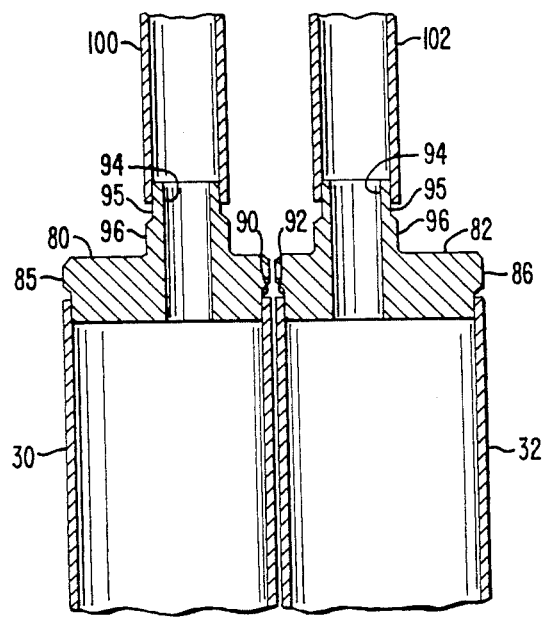
FIG._6.

DOUBLE-D WATER ROD FOR 9 BY 9 FUEL BUNDLE

BACKGROUND OF THE INVENTION

This invention relates to fuel bundles. More particularly, this invention relates to an improved water rod for placement interior of the fuel assembly, the fuel assembly having a preferred 9 by 9 array of rods.

SUMMARY OF THE PRIOR ART

Fuel assemblies are known. Typically, such fuel assemblies include a lower tie-plate, an upper tie-plate, and a surrounding channel therebetween. The channel usually has a square cross-section. In the square cross-section are placed fuel rods. Preferably these fuel rods are placed in rows and columns.

In boiling water nuclear reactors, water serves as a moderator. That is to say the water converts fast neutrons produced by an atomic reaction to slow neutrons. These slow neutrons in turn produce the desired atomic reaction. Typically, the process of the production of the atomic reaction, the production of the fast neutrons, the moderation of the neutrons with following production of atomic reaction endlessly reoccurs. The desired heating reaction results.

Interior of fuel bundles it is desired to increase the amount of moderator present. Specifically, in modern fuel bundle assemblies it has been found desirable to place along the interior of the fuel bundle larger volumes of water. These larger volumes of water typically displace fuel rods. The fuel rods when displaced have their volume occupied by water. The presence of the increased volume of water provides optimum moderation of the reaction within the fuel rods. In order to provide water in a single phase and separate the provided water from the two phase steam water mixture, it is common to introduce such water in so-called "water rods". This invention relates to a water rod.

SUMMARY OF RELATED DISCLOSURES (NOT PRIOR ART)

In certain nuclear fuel bundle designs, the use of a 9 by 9 fuel rod array is optimal. However, the placement of volumes of moderating water within water rods has not been without difficulty.

The cross-sectional area made available by removing the fuel rods has an irregular shape. For nuclear and thermal/hydraulic design efficiency, the water rod (or rods) should occupy as much of this area as possible. However, for minimum cost a simple cross-sectional shape is desirable; preferably circular or nearly circular.

The desirability for such a 9 by 9 array of rods can be seen in U.S. patent application No. 176,975, filed Apr. 4, 1988 entitled Two-Phase Pressure Drop Reduction BWR Assembly Design, assigned to the Assignee herein.

SUMMARY OF THE INVENTION

In a nuclear fuel bundle having a lower tie-plate, an upper tie-plate and a surrounding channel therebetween, an improved water rod is disclosed for preferable use when fuel rods held between the tie-plates are placed in a 9 by 9 array. Typically, seven fuel rods are omitted centrally of the 9 by 9 array with the middle or fifth row having three rods removed and paired rods being removed in the 4th and 6th row with displacement of the removed pair towards opposite corners. Into the volume created by the removed rods, there are placed two "D" sectioned rods, the "D" rods each being cylindrical except for a truncating chord eccentrically located beyond the diameter of the rod, this truncating chord defining the straight back of each "D". In the preferred embodiment one of the "D" water rods is provided with spacer tabs for maintaining spacers separating the fuel rod at their correct elevations. This rod is inserted with an alignment that permits the tabs to pass through the spacers. When the rod is fully inserted, it is rotated to a locking alignment so that the tabs capture the spacers. In this locked alignment, the straight back of the "D" is aligned to confront the straight back of the confronting "D" on the second water rod. When the second "D" rod is inserted with the backs confronted mutual, locking of both "D" sectioned water rods occurs. Provision is made for narrowing of the upper and lower sections of the water rods.

The upper and lower portions of the water rods are cylinders of reduced diameter which are joined to the central "D" section by transition pieces. Upper and lower end plugs are used for locating the complete water rod in the upper and lower tie plates, respectively. There results a pair of water rods which provides for efficient utilization of the available space, has low manufacturing costs, and provides for spacer capture enabling ease of assembly and disassembly of the fuel bundle.

OTHER OBJECTS, FEATURES AND ADVANTAGES

An object of this invention is to disclose placement of water rods in a 9 by 9 array of fuel rods contained within a square section channel. According to this aspect of the invention, the central row of fuel rods has three fuel rods displaced. On the periphery of the displaced central fuel rods and to and towards opposing corners, paired rods are removed. A total of seven rods are removed.

Into this region there are placed two D-sectioned rods, the rods being circular except for a truncating chord wall. This truncating cord defines the straight back that gives the disclosed water rod a "D" profile. Two "D" section rods are placed with their backs confronting one another.

An advantage of this aspect of the invention is that the "D" section rods are both easy to fabricate and conveniently occupy a large fraction of the volume of the displaced seven fuel rods from the 9 by 9 array.

An additional aspect of this invention is to arrange for the support of the fuel element spacers. According to this aspect of the invention, one of the "D" section rods is provided with protruding spacer support tabs. These tabs are sized and aligned with respect to one "D" sectioned water rod to pass through spacers in one angular orientation and to lock to the spacers in another angular orientation of the rod with respect to the spacers. The water rod with the tabs is inserted at an alignment which permits the tabs to pass through the spacers. When the rod is fully inserted, it is rotated to a tab locking orientation so that the tabs capture the spacers. In this locking alignment, the straight back of the "D" is aligned to confront the straight back of the "D" on the second water rod. When the second water rod is inserted, with the straight back for the insert "D" rod confronted to the back of the first "D" sectioned rod, the two "D" water rods lock in rotational and supporting alignment.

An advantage of this aspect of the invention is that both the assembly and disassembly of fuel bundles utilizing the water rods in this invention can easily occur. At the same time, the water rods cooperate in mutually locking relationship in maintaining spacer distribution within the fuel bundle.

BRIEF DESCRIPTION OF THE DRAWINGS

Other objects, features and advantages of this invention will become more apparent after referring to the following specification and attached drawings in which:

FIG. 1 is a perspective view of a fuel bundle having the double "D" water rods placed back-to-back, the fuel bundle having been cut away in the central portion so as to only show the top and bottom portions of the fuel bundle;

FIG. 2 is a section taken at right angles to the channel illustrating the water rod region in the 9 by 9 fuel bundle array of FIG. 1 without the water rods in place;

FIG. 3 is a section taken at the double "D" water rods and illustrating the immediately surrounding fuel rods and a portion of a ferrule spacer;

FIG. 4 illustrates the double "D" water rod of this invention taken in the vicinity of a square fuel rod spacer; and FIG. 5 illustrates the construction of the bottom of the water rod.

FIG. 6 illustrates the construction of the top of the water rod.

Referring to FIG. 1, a fuel bundle assembly B is illustrated. Assembly B includes a surrounding channel C. Channel C extends from an upper tie-plate 14 at the upper end to a lower tie plate 16 at the lower end. As is common in the prior art, the lower tie-plate is tapered, supported on a so-called elephant's foot casting (not shown) and makes provisions for receiving water and passing the water upwardly through the fuel bundle.

In the disclosed fuel bundle, a 9 by 9 array of fuel rods is shown. In FIG. 1, many of these fuel rods are omitted so that the double "D" water rods 30 and 32 may be seen.

The fuel rods include full length rods 18. Full length rods 18 extend between the lower tie plate 16 and the upper tie plate 14.

Also shown are partial length rods 20. Partial length rods 20 extend from the lower tie plate to a spacer 24. The partial length rods terminate above spacer 24.

A spacer 26 is provided with enlarged apertures overlying each of the partial length rods. Likewise the upper tie-plate includes enlarged apertures overlying each partial length rod.

The partial length rods are set forth in both function and purpose in that patent application entitled Two-Phase Pressure Drop Reduction, BWR Assembly Design filed Apr. 4, 1988, No. 176,975, owned by the common Assignee herein.

Generally, the partial length rods 20 serve to form steam voids overlying their terminated ends. These voids, during operation of the fuel bundle, form an escape path for the steam.

The present invention is directed to the water rods 30 and 32. In order to set forth this invention, the presence of moderator required for burning of the fuel rods will be set forth with respect to FIG. 2. Thereafter, the placement of the double "D" water rods back-to-back will be set forth with respect to FIG. 3. Referring to FIG. 4, the locking of the "D" water rods together for the support of spacers will be discussed. Finally, and with respect to FIGS. 5 and 6, the upper and lower transitions from the double "D" water rods to smaller diameter cylindrical rods will be illustrated.

Referring to FIG. 2, channel C is illustrated having a 9 by 9 row and column array of rods. These rods are shown with respective columns numbered 01-09 and rows numbered 11-19. Partial length rods 20 are illustrated. Full length rods 18 are illustrated.

It will be observed that the central portion of the fuel bundle has the rods removed. This removal is for the purpose of providing sufficient water moderator in the center of the bundle to optimize burning of fuel placed within the rods.

The configuration of the region without fuel rods can be easily understood. Realizing that row 05 has sufficient interval to accommodate nine rods, it will be seen that the three center rods are removed. In the direction of the corners 40 and 42, it is required that more void space be placed. Accordingly, rods in column 04 are removed from rows 15, 16. Likewise, rods in column 06 are removed from rows 14, 15. Thus, the water region comprises two overlying square sections. These overlying square sections have in common that spatial interval that would be occupied by a fuel rod placed at column 05, row 15.

It has been found that this configuration provides a suitable increase of water moderator throughout most of the length of the fuel bundle. What has been required is to find the optimum shape of water rod for placement within this interval.

The advantages of the present invention become apparent when alternate cross-sectional shapes of water rods are reviewed for placement to the 9 by 9 array of fuel rods herein set forth.

Presuming that a polygon cross-section is utilized, tracking the borders of the removed rods, efficient space utilization will be present. However, that kind of construction is expensive, and would not provide for any rotation of the members during insertion. Hence, the locking feature of this disclosure would not be available.

Similarly, two side by side cylindrical members would not use the available space efficiently. Such cylindrical members contact one another at their respective tangent points. In such contact at tangent points the contacted cylinders will define wasted spatial intervals that will not include the desirable water containing volumes.

In short, it is believed that the following double "D" configuration has optimal volume usage for the containment of the desired moderating water. Referring to FIG. 3, the double "D" water rod can now be described in cross-sectional configuration.

Referring to FIG. 3, the central twenty five spatial intervals for rods are shown. All these rods are full length rods 18. Insertion of the double "D" water rods is shown at 30, 32.

Each double "D" water rod includes a generally cylindrical, vertically extending wall 50. Wall 50 spans approximately 270° of arc of a cylinder.

In the case of double "D" water rod 30, wall 50 spans from the approximate 3:00 o'clock position to the 12:00 o'clock position.

In the case of rod 32, wall 50 spans from the 9:00 o'clock position to the 6:00 o'clock position.

Each of the walls is truncated by a flat, vertically extending chord wall 52. Cord wall 52 serves two purposes.

First, cord wall 52 provides a flat surface. Utilizing this flat surface, the two water rods can be placed interior of the fuel bundle in back to back relation. As placed in back to back relation, the rods utilized most of the volume of the removed seven rods. Confinement of water to an efficient moderating volume occurs.

Secondly, the backs 52 serve to lock the respective water rods from rotation. As will hereinafter be seen with respect to FIG. 4, by the expedient of placing supporting tabs on one water rod and allowing that water rod to be locked in place by the remaining water rod, a sure support of spacers at their desired elevation can occur.

The ferrule spacer shown in FIG. 3 is preferred. For each spacer, 2 tabs are welded to the water rod one above and one below the spacer (spacer must be restrained in both directions, up and down).

Referring to FIG. 4, rod 30 has spacer support tabs 61 placed thereon. The support tabs are here shown supporting a square grid spacer S. The particular supported square grid spacer S is that one shown at 26 (see FIG. 1).

The reader will realize that if "D" shaped water rod 30 is inserted before water rod 32, it will be possible to insert tabs 61–64 without interference with the spacer S. Simply stated, "D" shaped water rod 30 will be rotated 45°. In this alignment, each of the tabs 61–64 will pass in non-interfering alignment to the corners of the spacers. In such passage, full insertion of the water rod will occur.

Once rod 30 is fully inserted, it will be rotated. Upon rotation, the respective tabs 61–64 will rotate into positions underlying the structure of spacer S. Presuming that tabs are immediately under the spacer, it will be seen that the spacer will be supported at its appropriate elevational interval inside a fuel bundle B.

Once rod 30 is inserted and rotated to its final position, rod 32 is placed. Rod 32 is placed with its back 52 confronting the back 52 of rod 30. Thus, it will be appreciated that rod 30 is locked from further location. Thus, the tabs 61–64 are likewise locked. Support of the spacers at their desired elevational within the fuel bundle will occur.

Referring to FIG. 5, a section at the bottom of the assembly is taken along lines 5—5 of FIG. 3.

Specifically, "D" section water rods 30, 32 terminate each at ends 70. At ends 70 they are fitted to conical fittings 72.

Conical fittings 72 are, in fact, truncated at three planes.

The first plane of truncation is at 73. This plane produces on conical fitting 72 the same outside diameter as each of the water rods 30, 32. As each is common, the rods are each provided with an annulus 74 for receiving the lower inside diameter of the respective "D" shaped rods 70.

The second plane of truncation is along plane 75. This provides a truncated lower portion to the water rod support. This truncation occurs at a diameter equal to a tube 76 which is supported from the lower tie-plate. A tube 76 is fitted over the reduced diameter 77, and the tube 76 is welded to the transition piece 72.

The final plane of truncation is at 78. The truncation of 78 is a vertical plane which cuts off the side edge of what would otherwise be a cone. This defines on both fittings 72 a flat planar area wherein the fitting 72 can fit together in back to back relationship.

What is claimed is:

1. An improved fuel assembly including a lower tie-plate, an upper tie-plate, a square sectioned channel connecting said lower and upper tie-plate in fluid tight relation whereby fluid entering said lower tie-plate is discharged out said upper tie-plate, fuel rods each containing fissionable material therewithin, said fuel rods being held at said upper and lower tie-plates in a 9 by 9 array of rows and columns with all fuel rods having the same diameter; a plurality of spacers placed between said fuel rods for maintaining said fuel rods in spaced apart relation between said upper and lower tie-plates; said fuel rods in said 9 by 9 array having three said fuel rods removed from the middle row and two said fuel rods removed from each row on either side of said middle row to create a vacated interstitial volume defined by the absence of said removed fuel rods, the removal of said fuel rods at each row on either side displaced towards adjacent corners of said 9 by 9 array;

a pair of water rods for placement in the vacated interstitial volume, said water rods each including vertically extending cylindrical wall portions extending across approximately 270° of arc around a generally cylindrical form of said water rods and a truncating vertically extending cord wall being disposed in a flat planar vertically extending disposition between the two ends of said cylindrical wall portion of said water rods whereby said cord wall of said water rods imparts a generally "D" cross-section to said water rod, said water rods each being placed in back-to-back relation in said fuel bundle at said vacated spatial interval, said rods confronted at their respective flat cord walls whereby said vacated interstitial volume is filled with said water to provide improved water moderation of said nuclear reaction at said fuel bundle.

2. The invention of claim 1 and wherein said water rods are welded to transition pieces at the bottom, said transition pieces are welded to smaller diameter circular rods. Said rods have end plugs which fit in holes in the lower tie plates.

3. The invention of claim 2 and wherein said water rods are welded to transition pieces at the top, said transition pieces are welded to smaller diameter circular rods. Said rods have end plugs which fit in holes in the upper tie-plates.

4. The invention of claims 2 and 3 and wherein one of said water rods includes spacer tabs, said spacer tabs positioned for support of said spacers along the outside surface of said water rod.

5. In a fuel assembly including a lower tie-plate, an upper tie-plate, a square section channel connecting said lower and upper tie plates; fuel rods each containing fissionable material therewithin, said fuel rods being in a 9 by 9 array of rows and columns with all said fuel rods having the same diameter and, a plurality of spacers between said fuel rods for maintaining said fuel rods in spaced apart relation between said upper and lower tie-plates, the improvement to said fuel bundle including said fuel rods in said 9 by 9 array having three rods removed from the middle row and two rods removed from each row on either side of the middle row, the removal at either side row being displaced towards adjacent corners of said 9 by 9 array, said removed rods creating a vacated interstitial volume;

a pair of water rods for placement in the vacated interstitial volume created by the removal of said fuel rods, said water rods each including a vertically extending wall portion of said water rods extending to approximately 270° of arc around a generally cylindrical exterior; and a truncating vertically extending chord wall in a flat disposition closing said cylindrical wall portion of said said water rods whereby said cord wall of said water rod imparts a generally "D" cross-section to said water rods, said water rods being placed in back-to-back relationship in said fuel bundle at said vacated spatial interval with said two flat cord walls confronting one another whereby said vacated interstitial volume is filled with water rods to provide water moderation of a nuclear reaction in said bundle.

* * * * *